United States Patent [19]

Greco et al.

[11] 4,304,729

[45] Dec. 8, 1981

[54] COMPOUNDS FORMED BY COMBINING TRANSITION METAL HALIDES OR OXYHALIDES, OR ALUMINUM CHLORIDE, WITH ALKALINE EARTH METAL HALIDES

[75] Inventors: Alberto Greco, Dresano; Guglielmo Bertolini, Pavia; Gianfranco Pazienza, San Donato Milanese, all of Italy

[73] Assignees: Anic S.p.A., Palermo; Snamprogetti, S.p.A., Milan, both of Italy

[21] Appl. No.: 109,532

[22] Filed: Jan. 4, 1980

[30] Foreign Application Priority Data

Jan. 8, 1979 [IT] Italy ............................... 19124 A/79

[51] Int. Cl.$^3$ .............................................. C07F 7/28
[52] U.S. Cl. .............................. 260/429.5; 260/429 R; 260/439 R; 260/448 R; 423/306; 585/360
[58] Field of Search ............ 260/429 R, 429.5, 439 R, 260/448 R; 423/306

[56] References Cited

U.S. PATENT DOCUMENTS 3,397,212  8/1968  Welch et al. ..................... 260/429.5
4,133,823  1/1979  Joyce et al. ...................... 260/429 R
4,206,133  6/1980  Joyce et al. .................. 260/429.3 X

OTHER PUBLICATIONS

Lindqvist, Inorganic Adduct Molecules of Oxo-Compounds, Academic Press, Inc., N.Y., pp. 35–41, (1963).

*Primary Examiner*—Helen M. S. Sneed
*Attorney, Agent, or Firm*—Morgan, Finnegan, Pine, Foley & Lee

[57] ABSTRACT

Novel salt-like compounds adapted to be used as component of catalytic systems in the polymerization of ethylenically unsaturated monomers are disclosed: these compounds are obtained by reacting halides of transition metals or of aluminium with halides of alkaline earth metals, in the presence of phosphorous oxide derivatives which have the function of solvating agents. Also oxyhalides of transition metals lie within the scope of the invention.

6 Claims, No Drawings

COMPOUNDS FORMED BY COMBINING TRANSITION METAL HALIDES OR OXYHALIDES, OR ALUMINUM CHLORIDE, WITH ALKALINE EARTH METAL HALIDES

This invention relates to new compounds formed by combining transition metal halides or oxyhalides, or aluminium chloride, with alkaline earth metal halides solvated with derivatives of phosphorous oxide. It also relates to the method for preparing such compounds and to their uses, particularly their use as components of catalytic systems suitable for carrying out polymerisation reactions.

In detail, the products of the present invention are of saline nature and are obtained by reacting halides of transition metals or of aluminium with halides of alkaline earth metals in the presence of phosphorous oxide derivatives of the following formulas:

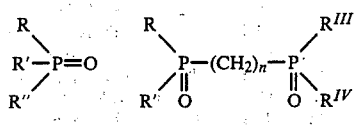

where R, R', R'', $R^{III}$ and $R^{IV}$, which are the same or different, can be halogen, simple or substituted alkyl or aryl radicals, or oxyalkyl or oxyaryl radicals, and n is a whole number between 1 and 10. Examples of these compounds are $C_6H_5POCl_2$; $ClCH_2POCl_2$; $(C_6H_5)_2POCl$; $(C_6H_5)_3PO$; $Cl_2POCH_2POCl_2$; $PO\,Cl_3$.

The aforesaid reaction therefore gives rise to the products of the present invention, which satisfy one of the following two general structural formulas:

in which the sum $(2y+x)$ represents the valency of M', which is the transition metal or aluminium; y has the values 0 or 1, and x can have any required value such that around the metal M', and in union with the ligand L which derives from one of the aforesaid phosphorous compounds, and with oxygen, the coordination number is attained for the most stable configuration of M' in the valency state in which it enters the formulation; M represents the alkaline earth metal and z its coordination number; and L' represents one halogen atom or the ligand L. In particular M' is chosen from $Mo^{6+}$, $Mo^{5+}$, $W^{6+}$, $Ti^{4+}$, $Fe^{3+}$ and $Al^{3+}$, and consequently the most stable configurations with which the value of x is linked are the octahedral (for $Mo^{6+}$, $W^{6+}$ or $Ti^{4+}$) and the tetrahedral (for $Fe^{3+}$ and $Al^{3+}$); M is chosen from Be, Mg, Ca and Sr, and z therefore assumes various values. Thus, for monodentate ligands, z is 4 for $Be^{2+}$ and 6 or 8 for $Mg^{2+}$, $Ca^{2+}$ and $Sr^{2+}$; for bidentate ligands, z is 2 for $Be^{2+}$ and 3 or 4 for $Mg^{2+}$, $Ca^{2+}$ and $Sr^{2+}$.

As stated heretofore, the saline compounds of formulas (1) and (2) are prepared by reacting the halide or oxyhalide of the transition metal (or $AlCl_3$) with the halide of the alkaline earth metal in the presence of the phosphorated compound. The alkaline earth metal halide is dissolved at high temperature, which can vary from 140° to 160° C. according to the starting compounds, in a large excess of the phosphorated compound if liquid, or in one of its concentrated solutions if solid. A large excess of the transition metal halide is added, and the system is then cooled to ambient temperature. Crystals of the product concerned separate out, and these are of satisfactory purity, but which can however be improved by the normal methods known to the experts of the art (for example by crystallisation).

One particularly useful preparation method, and which represents a modification to that heretofore described, is to use an extractor in which the halide of the alkaline metal and possibly of the transition metal (or of aluminium) is located.

This method, which is particularly useful for volatile derivatives of phosphorous oxide ($POCl_3$), enables the two different chlorides to be extracted under reflux.

The claimed salts are separated from the extracts in a particularly pure form, as the unreacted products and any impurities remain in the cup.

Chlorinated hydrocarbons represent suitable solvents for use in the case of a solid phosphorated compound.

The order of introduction of the various reagents is not important, and these can be placed in mutual contact in various ways, at the discretion of the expert of the art, without leaving the scope of the present invention.

As stated, the products of the present invention can be used as components of catalytic systems for the copolymerisation of unsaturated compounds, and this constitutes a further subject matter of the invention.

It is therefore possible to obtain copolymers of ethylene and alphaolefines, particularly those containing a number of carbon atoms equal to or greater than 6, for the preparation of medium or low density polyethylenes.

It is also possible to copolymerise ethylene with conjugate dienes, particularly butadiene, to give copolymers containing unsaturated bonds which can be vulcanised with sulphur even at very low unsaturation levels.

It is also possible to obtain homopolymers of ethylene. In this case, by using a support, it is possible to control the M.W. distribution in order to produce for example polythenes or ethylene-alphaolefine copolymers useful for blow-moulding. It is also possible to obtain homo and copolymers of cycloolefines, copolymers of higher homologues of ethylene and dienes, and copolymers of various alphaolefines.

The various polymerisation reactions are carried out by conventional methods, if necessary in the presence of a reaction medium consisting of an aliphatic or aromatic hydrocarbon, the catalyst being constituted by the mixture of one of the aforesaid compounds in union with an organo-metal compound of a metal belonging to one of the first three groups of the periodic system of elements. The reaction temperature is between −70° and 200° C., and the pressure can either be atmospheric, or be the pressure formed by the monomers in the reaction, or alternatively the reaction can take place under a pressure induced from the outside.

Molecular weight control can also be obtained by conventional methods. Alternatively, the compound catalyst according to the invention or one or more of its claimed salts can be used (by using a solvent such as $CH_2Cl_2$) suitably supported on an inert support chosen from polythene, polystyrene or polyacrylic resins, alumina etc. In this case, the use of an inert support in the polymerisation reaction constitutes an additional embodiment of the present invention, by means of which it is possible to control the morphology of the polymer obtained, and in certain cases the molecular weight distribution. One advantage of the catalysts is that they are soluble in apolar solvents ($CH_2Cl_2$), and can therefore be dispersed over any type of support by a dry method (absence of aqueous media).

EXAMPLES 1-8

Synthesis of compounds formed by combining transition metal halides or oxyhalides, or aluminium chloride, with metal halides containing the solvated cation of an alkaline earth metal.

Typical preparation: the desired quantity of alkaline earth metal chloride $TiCl_4$ and $POCl_3$ is placed in a 250 ml flask provided with a nitrogen connection, reflux condenser and magnetic bar stirrer. The contents of the flask are heated under stirring until vigorous reflux is obtained (120° C.). The reaction continues for the desired time. By cooling to ambient temperature, the crystals of the desired product used for RX analysis separate out over a period of 10-20 hours. In the case of P(O) φ $Cl_2$, the temperature was raised to 140° C.

Various experiments were carried out in this manner, and the results are summarised in the following table.

TABLE 1

| | Synthesis conditions | | | | | | t (h) | |
|---|---|---|---|---|---|---|---|---|
| | Ligand (L) | | M' chloride | | M chloride | | $M^1/M$ | t(h) |
| Ex. | type | quantity (ml) | type | quantity (mm) | type | quantity (mm) | (moles) | yield (g) |
| 1 | $POCl_3$ | 25 | $TiCl_4$ | 23 | $BeCl_2$ | 21 | 1.1 0.1 | 5.2 |
| 2 | $C_6H_5P(O)Cl_2$ | 35 | " | 22.7 | $MgCl_2$ | 10.6 | 2.1 0.5 | 15.5 |
| 3 | $POCl_3$ | 50 | " | 10 | " | 2 | 5 4 | 2.4 |
| 4 | " | 45 | " | 21.5 | $CaCl_2$ | 10 | 2.1 4 | 14.0 |
| 5 | $C_6H_5P(O)Cl_2$ | 45 | " | 34 | " | 16.6 | 2.1 1 | 9.5 |
| 6 | $POCl_3$ | 100 | " | 45 | $SrCl_2$ | 2.5 | 15 4 | 4.2 |
| 7 | $C_6H_5P(O)Cl_2$ | 40 | " | 45 | " | 11.5 | 3.9 0.5 | 8.5 |
| 8 | $POCl_3$ | 60 | $MoOCl_4$ | 15 | $BeCl_2$ | 18 | 0.8 1.5 | 3.5 |

| | Characterisation | | | | |
|---|---|---|---|---|---|
| | Elementary analysis (% weight) | | | | |
| Ex. | M' | M | P | Cl | Structural formula |
| 1 | 6.6 | — | 13.5 | 71.2 | $(Ti_2Cl_{10})^{2-}(BeL_4)^{2+} \cdot 2L$ |
| | (6.9) | — | (13.9) | (72.0) | M.W.1381 |
| 2 | 4.6 | 1.10 | 11.4 | — | $(TiCl_5 \cdot L)_2{}^-(MgL_6)^{2+}$ |
| | (4.7) | (1.2) | (12.2) | — | M.W.2035 |
| 3 | 5.6 | 1.7 | 14.5 | 70.5 | $(Ti_2Cl_{10})^{2-}(MgL_6)^{2+} \cdot 2L$ |
| | (5.6) | (1.4) | (14.6) | (71.0) | M.W.1703 |
| 4 | 5.6 | 1.5 | 15.2 | 69.5 | $(Ti_2Cl_{10})^{2-}(CaL_8)^{2+}$ |
| | (5.6) | (2.3) | (14.1) | (70.2) | M.W.1719 |
| 5 | 4.7 | — | 12.6 | 41.7 | $(TiCl_5 \cdot L)_2{}^-(CaL_8)^{2+}$ |
| | (4.0) | — | (12.7) | (43.7) | M.W.2441 |
| 6 | 4.9 | — | 13.6 | 68.3 | $(Ti_2Cl_{10})^{2-}(SrL_8)^{2+}$ |
| | (5.4) | — | (14.0) | (69.6) | M.W.1767 |
| 7 | 3.9 | — | 11.0 | 43.5 | $(TiCl_5 \cdot L)_2{}^-(SrL_8)^{2+}$ |
| | (3.5) | — | (12.5) | (42.9) | M.W.2488 |
| 8 | 12.5 | — | 12.0 | 63.6 | $(Mo_2O_2Cl_8)^{2-}(BeL_4) \cdot 2L$ |
| | (13.3) | — | (12.9) | (64.1) | M.W.143 |

Product characteristics:
1, yellow flakes m.p. 126-8° C.;
2, yellow prisms, m.p. 124-5° C.;
3, yellow prisms decomposing at 170° C.;
4, yellow prisms decomposing at 145° C.;
5, yellow crystals m.p. 132-5° C.;
6, yellow prisms m.p. 155-60° C.;
7, yellow crystals m.p. 150-2° C.;
8, emerald green needles.

EXAMPLES 9-16

Generally, an excess of $MgCl_2$ was placed in a cup with a G-3 sintered glass base together with the transition metal chloride or $AlCl_3$. The cup was placed in a small Kumagawa extractor (100 ml capacity) mounted on a 150 ml flask in which the required quantity of $POCl_3$ was placed.

The system was refluxed until the transition metal chloride had been completely removed from the cup. The crystals of the required salt separated out directly in the flask on slow cooling. In the case of $TiCl_4$, the transition metal chloride was used as a solution in the $POCl_3$.

Various experiments were carried out using the aforesaid method, and the results are summarised in the following table.

TABLE 2

| | Synthesis conditions | | | | | | t (h) | |
|---|---|---|---|---|---|---|---|---|
| | Ligand (L) | | M' chloride | | M chloride | | | |
| Ex. | type | quantity (ml) | type | quantity (mm) | type | quantity (mm) | (moles) | yield (g) |
| 9 | $POCl_3$ | 50 | $MoOCl_4$ | 1 | $MgCl_2$ | 7.5 | 0.13 0.20 | 0.8 |
| 10 | " | 50 | " | 5 | " | 11 | 4.5 2 | 6.6 |
| 11 | " | 35 | " | 6 | $CaCl_2$ | 40 | 0.15 2 | 4.0 |
| 12 | " | 40 | $WOCl_4$ | 9 | $MgCl_2$ | 15 | 0.6 2 | 4.2 |
| 13 | " | 40 | $FeCl_3$ | 20.3 | $BeCl_2$ | 2.8 | 2.3 1 | 3.0 |
| 14 | " | 40 | " | 12.5 | $MgCl_2$ | 11 | 1.1 2 | 4.5 |

TABLE 2-continued

| 15 | " | 40 | AlCl₃ | 30 | " | 10 | 3.0 | 2 | 10.5 |

| | Characterisation | | | | |
|---|---|---|---|---|---|
| | Elementary analysis (% weight) | | | | |
| Ex. | M' | M | P | Cl | Structural formula |
| 9 | 10.8 | 1.5 | 13.0 | — | $(MoOCl_5)_2{}^-(MgL_6)^{2+} \cdot 2L$ |
|  | (10.5) | (1.3) | (13.6) | — | M.W.1831 |
| 10 | 10.8 | 1.4 | 15.6 | 64.0 | $(Mo_2O_2Cl_8)^{2-}(MgL_6)^{2+} \cdot 2L$ |
|  | (11.0) | (1.4) | (14.1) | (64.6) | M.W.1760 |
| 11 | 13.5 | 3.0 | 12.4 | — | $(Mo_2O_2Cl_8)^{2-}(CaL_8)^{2+}$ |
|  | (13.1) | (2.7) | (12.7) | — | M.W.1776 |
| 12 | 17.5 | 1.2 | — | 59.1 | $(WOCl_5)_2{}^-(MgL_6)^{2+} \cdot 2L$ |
|  | (17.8) | (1.2) | — | (59.8) | M.W.2007 |
| 13 | 8.6 | — | 12.8 | 69.8 | $(FeCl_4)_2{}^-(BeL_4)^{2+} \cdot L$ |
|  | (9.5) | — | (13.2) | (70.6) | M.W.1172 |
| 14 | 7.9 | 1.4 | 13.8 | 69.2 | $(FeCl_4)_2{}^-(MgL_6)^{2+}$ |
|  | (8.9) | (1.8) | (14.1) | (70.2) | M.W.1337 |
| 15 | 3.8 | 1.5 | 15.4 | 71.0 | $(AlCl_4)_2{}^-(MgL_6)^{2+}$ |
|  | (3.4) | (1.5) | (15.6) | (71.4) | M.W.1590 |

Product characteristics:
9, yellow brown prisms which become green at 90-5° C., m.p. 210-14° C.;
10, green prisms, m.p. 208-10° C.;
11, green needles, m.p. 105-16° C. (become brown);
12, red crystals, m.p. 230-3° C.;
13, pale yellow flakes, decomposing at 200° C.;
14, pale yellow flakes, m.p. 240-5° C.;
15, colourless needles.

EXAMPLES 16-35

Polymerisation of the unsaturated compounds concerned was carried out by placing 1000 ml of a n-heptane solution of olefine and/or comonomer and 4 mM of trisobutylaluminium in that order in a steel autoclave of 2 liters capacity provided with a stirrer and thermostat set to 85° C.

Hydrogen, and, if appropriate, olefine were then fed until the required pressure was obtained. The tests were blocked by adding 5 ml of isopropanol, and the polymers were dried at 50° C. under vacuum until constant weight was obtained.

Reference should be made to the relative examples for the various types of polymerisation. (16)

Ethylene/1-hexene copolymer; 0.089 mm of Ti of Example 2, Table 1, 1.9 moles of 1-hexene, 2 atm. of $H_2$ and 10 of ethylene, polymerisation time 1.5 hours.

$C_2$/1-hexene copolymer yield, 320 g, MF 2.16 (g/10 min.) 0.67, MF 21.6/MF 2.16=31 at 13.3 ppm of Ti.

Real density (g/ml) 0.9420, $C_6$ (% in moles) 0.6; $\dot{\gamma}_c$ (shear rate in sec$^{-1}$) 480, impact (IZOD)/J/m 314; yield point (MPa) 15; ultimate tensile stress (MPa) 29; elongation (%) 771, modulus of elasticity (MPa) 490.

EXAMPLE 17

The polymerisation was carried out with 0.078 mm of Ti of Example 2 of Table 1, 3.92 moles of 1-hexene, 0.5 atm. of $H_2$ and 10 atm. of $C_2H_4$ with a polymerisation time of 1 hour.

The yield was 230 g of $C_2$/1-hexene copolymer, MF 2.16 (g/10 min.) 0.91, MF 21.6/MF 2.16=38, at 18.2 ppm of Ti; real density 0.9107, $C_6$ (% in moles) 1.2; the copolymer did not break on impact; ultimate tensile stress (MPa) 21; elongation (%) 752; modulus of elasticity 170 (MPa).

EXAMPLE 18

The polymerisation was carried out with 0.065 mm of Ti of Example 2 of Table 1, 3.71 moles of 1-hexene, 1 atm. of $H_2$, and 10 atm. of $C_2H_4$ for 2 hours. At the end of this time, the autoclave was bled to adjust the ethylene pressure to 2 atmospheres, and the reaction was continued for a further 2 hours.

The yield was 260 g of ethylene/1-hexene copolymer, MP 2.16 (g/10 min.) 1.47, MF 21.6/MF 2.16=48 at 12 ppm of Ti, $C_6$ (% in moles) 1.45, real density (g/ml) 0.9073. The copolymer did not break on impact; ultimate tensile stress (MPa) 17, elongation (%) 771; modulus of elasticity (MPa) 490.

EXAMPLE 19

Ethylene/4-methyl-1-pentene copolymerisation

The copolymerisation was carried out with 0.062 mm of Ti of Example 2 of Table 1, 3.25 moles of 4-methyl-1-pentene, 1 atm. of $H_2$ and 10 atm. of ethylene for 1 hour. 240 g of ethylene/4-methyl-1-pentene copolymer were obtained; MF 2.16 (g/10 min.) 0.053, MF 21.6/MF 2.16=33 at 12.3 ppm of Ti, real density (g/ml) 0.9271, $C_6$ (%) in moles 1.0; the polymer did not break on impact; yield point (MPa) 13; ultimate tensile stress (MPa) 28; elongation (%) 590; modulus of elasticity (MPa) 432.

EXAMPLE 20

Ethylene/butadiene copolymerisation

The polymerisation was carried out with 0.066 mm of Ti of Example 2 of Table 1, 0.76 moles of 1,3 butadiene, 2.5 atm. of $H_2$ and 10 atm. of $C_2H_4$ for a time of 2.5 hours. The $C_2/C_4$ copolymer yield was 122 g, MF 2.16 (g/10 min) 0.14, MF 21.6/MF 2.16=26 at 25.6 ppm of Ti.

The polymer, which had 1.8% by weight of matter extractable in acetone at ambient temperature, had a total unsaturation of 0.4% (in moles of $C_4$) with a 1:4 trans/vinyl unsaturation ratio of 3.

The residual polymer powder from the acetone extraction (100 parts by weight) was homogenised with ZnO (5 parts), stearic acid (1 part), 2,2' methylene-bis(4-methyltributylphenol) (1 part), tetramethylthiouramyl-disulphide (0.5 parts) and sulphur (3 parts), and vulcanised in a press at 180° C. for 30 minutes.

After vulcanisation, the ethylene/butadiene copolymer had 30% of material unextractable by boiling xylene (gel %).

EXAMPLE 21

Ethylene and butadiene were again copolymerised using 0.07 mm of Ti of Example 2 of Table 1, 0.15 moles of 1,3 butadiene, 4 atm. of $H_2$ and 11 atm. of $C_2H_4$.

After 4 hours, 210 g of $C_2/C_4$ copolymer were discharged from the autoclave, MF 2.16 (g/10 min.) 0.22, MF. 21.6/MF 2.16=30 at 16 ppm of Ti.

The polymer, which had 2.2% by weight of material extractable in cold acetone, had a total unsaturation of 0.88 mol % of $C_4$, with a 1,4 trans/vinyl unsaturation ratio of 3.2.

When the acetone residue of this copolymer was vulcanised using the same substances and under the same conditions as Example 21, the gel (%) as defined in Example 21, was 65%.

EXAMPLE 22

Homopolymerisation of ethylene 0.051 mm of Ti of Example 6 of Table 1 was used in polymerising ethylene at 3 atm. of $H_2$ and 10 atm. of ethylene.

After 6 hours, 96 g of polythene were obtained, MF 2.16 (g/10 min) 0.036; MF 21.6/MF 2.16=53.4 at 25.4 ppm of Ti.

EXAMPLE 23

0.096 mm of Example 5 of Table 1 were used in polymerising ethylene at 2.5 atm. of $H_2$ and 10 atm. of $C_2H_4$.

After 6 hours 345 g of polymer were obtained, MF 2.16 (g/10 min.) 0.22; MF 2.16/MF 2.16=24 at 13.4 ppm of Ti.

EXAMPLE 24

Homopolymerisation of ethylene on a support

A commercial polystyrene resin (XAD-2, Rohm and Haas, 300 m$^2$/g) was ground and sieved, and the fraction between 38 and 53$\mu$/(micron) collected. This fraction was purified in a Soxhlet apparatus by extraction with methanol, dried in a $P_2O_5$ drier for at least 48 hours under static vacuum, and finally degassed under dynamic vacuum and preserved in a nitrogen atmosphere.

This resin (1.09 g) was suspended in $CH_2Cl_2$ (25 ml) together with Example 15 of Table 2 (0.0528, 5% by weight) and stirred for 30 minutes at ambient temperature. Finally, Example 3 of Table 1 (0.125 g, 12% by weight) was added, and stirring continued for a further 30 minutes.

The resin (grey colour) was evaporated to dryness under vacuum. The powder had a calculated Ti content of 0.55% by weight. 0.082 mm of the Ti supported in this manner were used in a polymerisation test at 3 atm. of $H_2$ and 10 atm. of ethylene. After 6 hours, 370 g of polythene were discharged, MF 2.16 (g/10 min.) 0.20, MF 21.6/MF 21.6=40; apparent density (g/ml) 0.39; the polymer is free flowing with a shear rate of 4/sec., with 90% of the particles having an average size of between 100 and 600$\mu$ at 10.6 ppm of Ti.

EXAMPLE 25

Powdered polythene (1.2 g of particles of average size 65–80$\mu$) was suspended in $CH_2Cl_2$, and example 2 of Table 1 was added (0.158 g, 11.5% by weight), and the suspension was stirred for 30 minutes at ambient temperature, after which the $CH_2Cl_2$ was removed under vacuum.

The titanium content was 0.53% by weight. 0.075 mm of the titanium thus obtained were used in an ethylene polymerisation test, with 4 atm. of $H_2$ and 11 atm. of ethylene.

After 3.5 hours, 370 g of polythene were obtained, MF 2.16 (g/10 min) 0.31, MF 21.6/MF 2.16=30 at 9.8 ppm of Ti. The polymer was free flowing, with a shear rate of 5/sec., and 70% of the particles had an average size of between 100 and 600$\mu$.

EXAMPLE 26

The same resin used in Example 24 (1.80 g) was suspended in $CH_2Cl_2$ (20 ml) and treated with Example 15 (0.171 g). The resin suspension was stirred for 30 min. at ambient temperature, and 0.225 g of Example 1 of Table 1 were then added.

Stirring continued for 30 min. at the same temperature.

The solvent was removed under vacuum to leave a red violet powder having a calculated titanium content of 0.68% by weight. 0.128 mm of supported titanium were used in an ethylene polymerisation test at 3 atm. of $H_2$ and 10 atm. of ethylene. After 6 hours, 430 g of polythene were discharged, MF 2.16 (g/10 min.) 0.45, MF 21.6/MF 2.16=42 at 14 ppm of Ti, which was free flowing (shear rate 4/sec.) and of which 80% had an average particle size of between 100 and 600$\mu$.

EXAMPLE 27

Polymerisation of cycloolefines 1 ml of a solution of Example 12 in chlorobenzene (0.406 g in 25 ml) (2.75 mg of W) was added to a solution of TiBAL (0.25 ml 1 mm) in cyclopentene (5 ml) at 0° under stirring.

After 4 hours of stirring at this temperature, 1.8 g (47% yield) of polycyclopentenamer with double bonds mainly of trans structure (81.3 mol %) coagulated in ethanol. The residual unsaturation consisted of cis double bonds (18.7%).

EXAMPLE 28

0.08 g of Example 9 were added to a solution of TiBAL (0.25 ml, 1 mm) in cyclopentene (5 ml) cooled to 0° C. under stirring.

After 2 hours, 0.45 g (12.5% yield) of polypentenamer with mainly cis unsaturation (78%) coagulated in methanol. The residual unsaturation consisted of trans double bonds (12%).

EXAMPLE 29

Propylene-butadiene copolymer 15 cc of 1,3 butadiene, 15 cc of propylene, 3 mm of Al(n-hexyl)$_3$ and 0.312 g of Example 2 were dissolved in that order in 20 ml of toluene. The solution was stirred at −20° C. for 16 hours, and 0.5 g of $C_3$/butadiene copolymer finally coagulated having a butadiene content of 73 mol % (by $^1H$ N.M.R. analysis; peaks at 0.8 and 1.2 ppm for the propylene, 2.0, 5.0, 5.35 ppm for the butadiene, solvent $CDCl_3$, reference HMDS).

EXAMPLE 30

Polymerisation of 1-decene n-1-decene (10 g) was stirred with 0.5 g of Example 15 in methylene chloride (5 ml) at 50° C. for 4 hours in a small steel reactor. The reaction was checked with isopropanol. The product was taken up in methylene chloride (100 ml) and washed repeatedly with a 0.1 N aqueous solution of HCl, an aqueous solution of NaHCO$_3$ and finally with water. This solution was dried in CaCl$_2$ and filtered from it, and the CH$_2$Cl$_2$ and unreacted 1-decene were removed under 0.1 mm vacuum at 100° C. (6 hours).

The residue weighed 6.5 g (65% yield) with a viscosity of 30.5 centistokes at 100° C.

EXAMPLE 31

Mixture of two different products on a support 160 mg of Example 15 of Table 2 in 50 ml of CH$_2$Cl$_2$ were added to the same resin used for preparing the catalyst of Example 24 (75–150μ fraction, 1.75 g) and the mixture was stirred at ambient temperature for 1 hour.

182 mg of Example 7 of Table 1 were then added, stirring for a further 30 minutes at ambient temperature, and the CH$_2$Cl$_2$ was finally removed under vacuum. The product thus obtained had a Ti content of 0.28%. 1.000 g of this product was used in a polymerisation test identical to that described in Example 24. 250 g of polythene were obtained, MF 2.16 (g/10 min.) 1.0, MF 21.6/MF 2.16=31 at 11.2 ppm of Ti, with 95% of particles having an average size>200μ, and an apparent density of 0.3 g/ml. It was free flowing (5/sec.).

EXAMPLE 32

171 mg of Example 15 and 225 mg of Example 1 were added in that order to the same resin as Example 24 (75–150μ fraction, 1.80 g) in methylene chloride under the same conditions as Example 31, to give a product having a Ti content of 0.60%. 0.950 g of this product were used in a polymerisation test identical to Example 24 to give 290 g of polythene, MF 2.16 (g/10 min.) 0.017, MF 21.6/MF 2.16=68 at 19.7 ppm of Ti, with 80% of particles having an average size>200μ, apparent density 0.33 g/ml. It was free flowing (4/sec.).

EXAMPLE 33

Example 14 (210 mg) and Example 1 (200 mg) were added in that order to the same resin as used in Example 24 (75–150μ fraction, 2.0 g) in CH$_2$Cl$_2$ under the same conditions as Example 31, to give a material containing 0.35% of Ti.

0.1100 g of this product were used in a polymerisation test identical to that described in Example 9 to give 170 g of polythene, MF 2.16 (g/10 min.) 0.07, MF 21.6/MF 2.16=28 at 22 ppm of Ti, with >94% of particles having an average size of >200μ, apparent density 0.32 g/ml. It was free flowing (5 sec.).

EXAMPLE 34

Commercial αAl$_2$O$_3$ (Bohemite) was kept at 700° C. for 20 hours, and 10 g were then treated with TiCl$_4$ (60 ml) at 140° C. (under reflux) for 2 hours. After filtration, the Ti content of this αAl$_2$O$_3$ was 1.1%.

4.35 g of the αAl$_2$O$_3$ treated with TiCl$_4$ were suspended in 15 ml of CH$_2$Cl$_2$, and 1.20 g of product 3 of Table 1 were added.

The suspension was vigorously stirred for 30 min. at ambient temperature, and finally the CH$_2$Cl$_2$ was removed under vacuum. The final product had a Ti content of 1.5%.

122 mg of this product were used in an ethylene polymerisation test with a partial pressure of H$_2$ of 11 atm. and a partial pressure of ethylene of 9 atm., in 0.5 liters of heptane at 85° C. for 2 hours, to give 78 g of polythene, MF 2.16 (g/10 min.) 0.25, MF 21.6/MF 2.16=80 at 23.5 ppm of Ti.

EXAMPLE 35

The same αAl$_2$O$_3$ (10 g) as Example 34, dried for 24 hours at 700° C., was fluorinated with NH$_4$F (1.0 g) at 600° C. for 4 hours. This product (5 g) with a fluorine content of 1.2% was suspended in TiCl$_4$ (50 ml) and stirred vigorously for 90 minutes at 140° C., and finally washed and dried under vacuum.

On analysis, this product gave: Ti 1.6%, Cl 4.1%.

This material (4.35 g) was suspended in CH$_2$Cl$_2$ (10 ml), together with product 3 of the table (1.2 g), and was stirred energetically for 60 minutes at ambient temperature. The CH$_2$Cl$_2$ was finally removed under vacuum to give a product having the following composition: Ti 2.6%, Mg 0.66%, Cl 16.74%.

410 mg of this system, TiBAL (8 mm), n-heptane (1000 ml) and 1-hexene (25 ml) were used in a polymerisation test of 2 hours at 13 atm. of H$_2$ and 9 atm. of C$_2$H$_4$, to give at 85° C. 120 g of ethylene/1-hexene copolymer, MF 2.16 (g/10 min) 0.20, MF 21.6/MF 2.16=104 at 99 ppm of Ti, density 0.958.

EXAMPLE 36

The same αAl$_2$O$_3$ as Example 34 (10 g) was treated at 700° C. for 2 hours, and was then sulphurated with concentrated H$_2$SO$_4$ at 550° C. to give a material with a sulphur content of 1.5%. This material (5 g) was suspended in TiCl$_4$ (30 ml) and was stirred for 1 hour at 140° C., to give a product, after hydrocarbon washing and drying under vacuum, with a content of 1.2% Ti and 3.7% Cl. This material (4.50 g) was suspended in CH$_2$Cl$_2$ (10 ml) together with product 2 of Table 1, and stirred for 60 minutes at ambient temperature, after which the CH$_2$Cl$_2$ was removed under vacuum to give a material of the following composition: Ti 2.0%, Mg 0.60%, Cl 12.8%. 430 mg of this material at 13 atm. of H$_2$ and 8 atm. of C$_2$H$_4$ with 8 mm/1 of TiBAL and 1 l of n-heptane gave 210 g of polythene in 3 hours, MF 2.16 (g/10 min.) 0.11, MF 21.6/MF 2.16=120 with a Ti content of 41 ppm.

We claim:

1. A compound formed by the reaction of a transition metal halide or oxyhalide, or an aluminum halide, with an alkaline earth metal halide, in a liquid phase, in the presence of phosphorous oxide derivatives of the general formula:

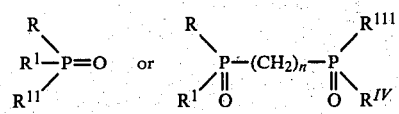

wherein each of R, R$^1$, R$^{11}$, R$^{111}$ and R$^{IV}$ are selected from the group consisting of halogen, alkyl, aryl, oxyalkyl and oxyaryl radicals, and n is a whole number between 1 and 10.

2. The compound of claim 1 wherein the transition metal halide is an halide of Mo$^{6+}$, Mo$^{5+}$, W$^{6+}$, Ti$^{4+}$ or Fe$^{3+}$.

3. The compound of claim 1 wherein the alkaline earth metal halide is an halide of Be$^{2+}$, Mg$^{2+}$, Ca$^{2+}$ or Sr$^{2+}$.

4. A process for preparing the compound of claim 1 wherein a transition metal halide or oxyhalide or an aluminum halide is reacted with an alkaline earth metal halide, in a molar ratio of from about 0.13 to about 15, in a liquid phase and in the presence of phosphorous oxide derivatives of the general formula:

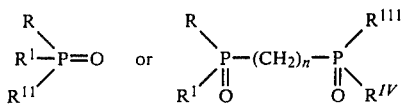

wherein each of $R$, $R^1$, $R^{11}$, $R^{111}$ and $R^{IV}$ are relected from the group consisting of halogen, alkyl, aryl, oxyalkyl and oxyaryl radicals, and n is a whole number between 1 and 10.

5. The process of claim 4 wherein the transition metal halide is an halide of $Mo^{6+}$, $Mo^{5+}$, $W^{6+}$, $Ti^{4+}$, or $Fe^{3+}$.

6. The process of claim 4 wherein the alkaline earth metal halide is an halide of $Be^{2+}$, $Mg^{2+}$, $Co^{2+}$ or $Sr^{2+}$.

* * * * *